(12) United States Patent
Nakayama et al.

(10) Patent No.: US 10,300,841 B2
(45) Date of Patent: May 28, 2019

(54) IRRADIATING DEVICE

(71) Applicant: KABUSHIKI KAISHA TOKAI-RIKA-DENKI-SEISAKUSHO, Aichi-ken (JP)

(72) Inventors: Yuto Nakayama, Aichi-ken (JP); Kazuyuki Yokoyama, Aichi-ken (JP)

(73) Assignee: KABUSHIKI KAISHA TOKAI-RIKA-DENKI-SEISAKUSHO, Aichi-ken (JP)

(*) Notice: Subject to any disclaimer, the term of this patent is extended or adjusted under 35 U.S.C. 154(b) by 0 days.

(21) Appl. No.: 15/947,325

(22) Filed: Apr. 6, 2018

(65) Prior Publication Data

US 2018/0297512 A1 Oct. 18, 2018

(30) Foreign Application Priority Data

Apr. 12, 2017 (JP) ................................. 2017-079172

(51) Int. Cl.
*B60Q 1/24* (2006.01)
*B60Q 1/26* (2006.01)
*F21S 43/14* (2018.01)
*B60R 1/06* (2006.01)
*B60R 1/12* (2006.01)
(Continued)

(52) U.S. Cl.
CPC ............ *B60Q 1/24* (2013.01); *B60Q 1/2665* (2013.01); *B60Q 1/2696* (2013.01); *B60R 1/06* (2013.01); *B60R 1/12* (2013.01); *F21S 43/14* (2018.01); *F21S 43/315* (2018.01); *F21S 43/40* (2018.01); *F21V 5/04* (2013.01); *G02B 19/0028* (2013.01); *G02B 19/0061* (2013.01); *G02B 19/0071* (2013.01)

(58) Field of Classification Search
CPC ................. B60Q 1/24; F21V 5/04; B60R 1/06
See application file for complete search history.

(56) References Cited

U.S. PATENT DOCUMENTS 6,152,590 A 11/2000 Fürst et al.
6,598,999 B2 * 7/2003 Horiuchi ............... G06F 1/1616
362/307
(Continued)

FOREIGN PATENT DOCUMENTS

DE 102008061688 A1 6/2010
DE 102014223854 5/2015
(Continued)

OTHER PUBLICATIONS

Extended European Search Report issued in European Application No. 18166485.5 dated Aug. 29, 2018.

*Primary Examiner* — Joseph L Williams
(74) *Attorney, Agent, or Firm* — Roberts Mlotkowski Safran Cole & Calderon, P.C.

(57) ABSTRACT

In a vehicle lamp device, light emitted by a LED enters a concentration element of a lens and is irradiated from an irradiating face of the concentration element. The reflecting face of the concentration element surrounds a central axis of the concentration element. Light that enters the concentration element is reflected by the reflecting face toward a central axis side of the concentration element, and light reflected by the reflecting face is irradiated from the irradiating face. The concentration element is thus able to efficiently concentrate light emitted by the LED.

11 Claims, 2 Drawing Sheets

(51) Int. Cl.
  *F21V 5/04*    (2006.01)
  *F21S 43/31*   (2018.01)
  *F21S 43/40*   (2018.01)
  *G02B 19/00*   (2006.01)

(56) References Cited

U.S. PATENT DOCUMENTS

| | | | |
|---|---|---|---|
| 8,058,665 B2 * | 11/2011 | Wang | F21V 5/008 |
| | | | 257/98 |
| 8,469,567 B2 * | 6/2013 | Futami | B60Q 1/0041 |
| | | | 362/545 |
| 8,633,641 B2 * | 1/2014 | Lin | F21V 5/04 |
| | | | 313/327 |
| 2012/0113653 A1 | 5/2012 | Koizumi | |
| 2014/0177249 A1 * | 6/2014 | Iseki | B60Q 1/2665 |
| | | | 362/511 |
| 2015/0153015 A1 | 6/2015 | Watanabe | |
| 2016/0116140 A1 * | 4/2016 | Eguchi | H01L 25/0753 |
| | | | 362/293 |

FOREIGN PATENT DOCUMENTS

| | | |
|---|---|---|
| EP | 1488954 A1 | 12/2004 |
| EP | 2367045 A1 | 9/2011 |
| JP | S60158605 U | 10/1985 |
| JP | 2004356512 A | 12/2004 |
| JP | 2008-132875 A | 6/2008 |
| JP | 2012099409 A | 5/2012 |
| KR | 20100046409 A | 5/2010 |

* cited by examiner

IRRADIATING DEVICE

CROSS-REFERENCE TO RELATED APPLICATION

This application claims priority under 35 USC 119 from Japanese Patent Application No. 2017-079172 filed Apr. 12, 2017, the disclosure of which is incorporated by reference herein.

BACKGROUND

Field of the Invention

The present disclosure relates to an irradiating device in which an irradiating body irradiates light emitted from an emitter.

Related Art

Japanese Patent Application Laid-Open (JP-A) No. 2008-132875 discloses a door mirror in which a lens is disposed at the lower side of a lamp such that light emitted by the lamp is irradiated toward the lower side by the lens. Plural steps that are triangular in cross-section are formed on an inner face (upper face) of the lens, with the plural steps being disposed at uniform intervals in a state extending parallel to one another.

In such a door mirror, it is preferable that the lens is able to efficiently concentrate light emitted by the lamp.

SUMMARY

In consideration of the above, an irradiating device is obtained in which light emitted by an emitter can be efficiently concentrated by an irradiating body.

An irradiating device of a first aspect includes: an emitter that is provided at a vehicle and that emits light; and an irradiating body that is disposed at one side of the emitter, and at which a reflecting face is provided so as to surround the emitter, the reflecting face reflecting light emitted by the emitter toward a center side of the irradiating body, and the irradiating body irradiating light reflected by the reflecting face toward the one side.

An irradiating device of a second aspect is the irradiating device of the first aspect, further including an irradiating face that is provided at the irradiating body, wherein: the irradiating face is concave toward another side, and the irradiating face irradiates light reflected by the reflecting face toward the one side of the irradiating body.

An irradiating device of a third aspect is the irradiating device of the first aspect or the second aspect, further including an incident face that is provided at the irradiating body at a center side of the reflecting face, wherein: the incident face is convex toward the another side, and light emitted by the emitter is incident at (is entered in) the incident face.

An irradiating device of a fourth aspect is the irradiating device of any one the first aspect to the third aspect, wherein the emitter is disposed at an inner side of the reflecting face.

In the irradiating device of the first aspect, the irradiating body is disposed on one side of the emitter in a vehicle.

The reflecting face is provided at the irradiating body, and the reflecting face is provided so as to surround the emitter such that light emitted by the emitter is reflected toward the center side by the reflecting face and the irradiating body irradiates light reflected by the reflecting face toward the one side. The irradiating body is thus able to by using the reflecting face to efficiently concentrate light emitted by the emitter.

In the irradiating device of the second aspect, the irradiating face is provided at the irradiating body, and light reflected by the reflecting face is irradiated toward the one side of the irradiating body by the irradiating face.

The irradiating face is concave toward the another side. The focal point (converged point) of light reflected by the reflecting face and irradiated toward the one side of the irradiating body by the irradiating face can thus be made closer to the irradiating body.

In the irradiating device of the third aspect, the incident face is provided at the irradiating body at the center side of the reflecting face, and light emitted by the emitter enters the incident face.

The incident face is convex toward the another side. Light that enters the incident face can thus be effectively refracted toward the center side of the reflecting face, enabling light emitted by the emitter to be even more efficiently concentrated by the irradiating body.

In the irradiating device of the fourth aspect, the emitter is disposed at the inside of the reflecting face. Light emitted by the emitter is thus efficiently reflected by the reflecting face, enabling light emitted by the emitter to be even more efficiently concentrated by the irradiating body.

BRIEF DESCRIPTION OF THE DRAWINGS

An exemplary embodiment will be described in detail with reference to the following figures, wherein.

DETAILED DESCRIPTION

Figure 1:
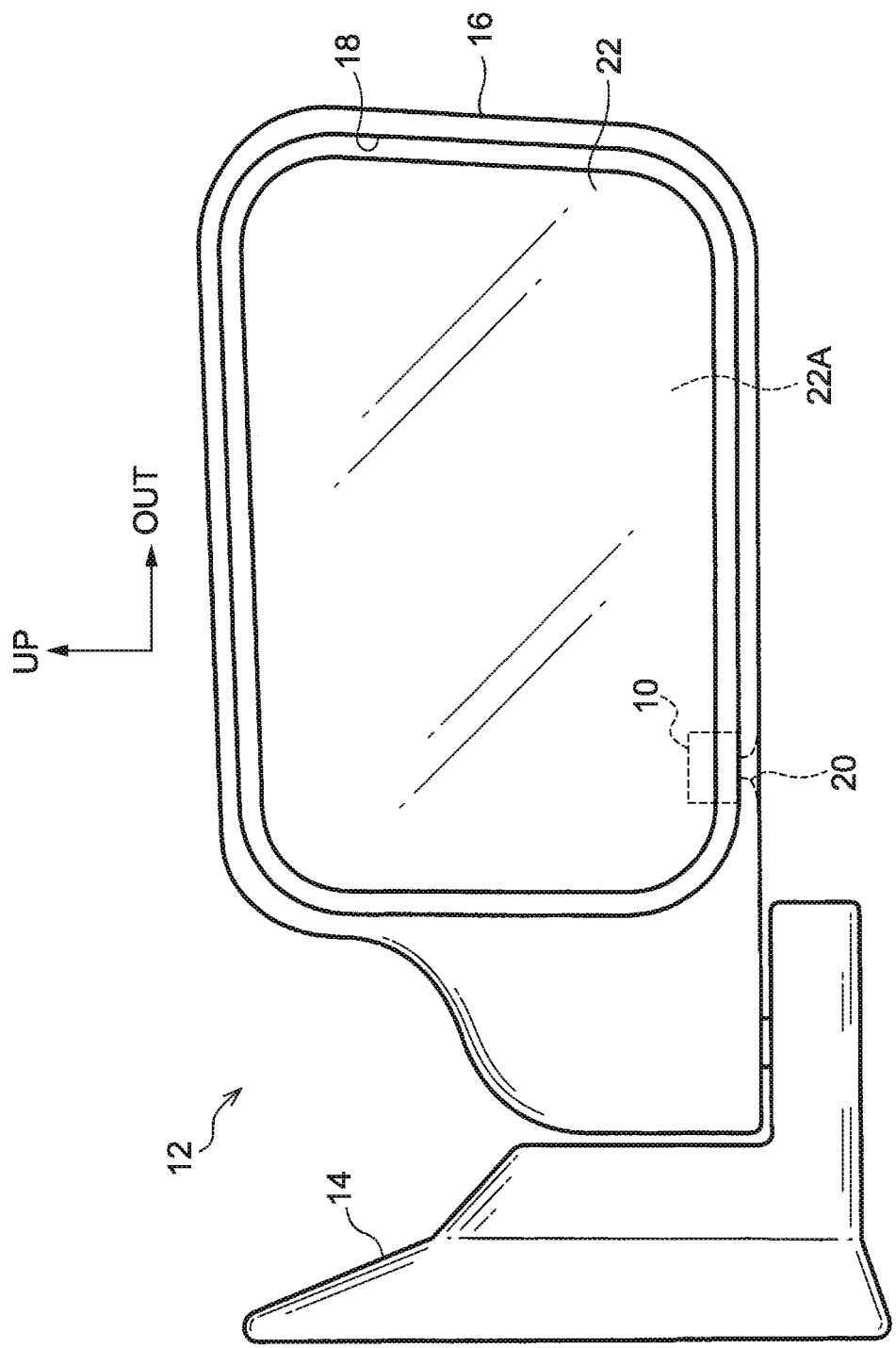
FIG. 1 is a face-on view illustrating a vehicle door mirror device of an exemplary embodiment, as viewed from the vehicle rear.

FIG. 1 is a face-on view of a vehicle door mirror device 12 (installation body) in which a vehicle lamp device 10 (irradiating device) according to an exemplary embodiment has been installed, as viewed from the vehicle rear. Note that in the drawings, the arrow OUT indicates outward (the vehicle right) in the vehicle width direction, and the arrow UP indicates upward.

The vehicle door mirror device 12 of the present exemplary embodiment is provided to a vehicle outside at an up-down direction intermediate portion and a vehicle front side end of a side door (in particular a front side door), this being a door of the vehicle.

As illustrated in FIG. 1, the vehicle door mirror device 12 includes a stay 14, this being a fixing member. A vehicle width direction inside end of the stay 14 is fixed to the side door (vehicle body side) to install the vehicle door mirror device 12 to the side door.

A visor 16, this being an installation member, is supported at a vehicle width direction outside portion of the stay 14. The visor 16 is made of resin and has a substantially rectangular parallelopiped container shape. The visor 16 projects out toward the vehicle width direction outside of the stay 14 and is configured so as to be opaque to light. A substantially rectangular opening 18 is formed passing through a vehicle rear-side wall of the visor 16. The opening 18 exposes the inside of the visor 16 to the vehicle rear side. A substantially truncated cone shaped irradiating aperture 20

(see FIG. 2) is formed passing through a lower wall of the visor 16. The irradiating aperture 20 exposes the inside of the visor 16 to the lower side, and has a diameter that increases on progression toward the lower side.

A substantially rectangular plate shaped mirror 22, this being a visual recognition member, is supported within the visor 16. The mirror 22 is disposed in the vicinity of the opening 18 inside the visor 16, and the mirror 22 substantially closes off the opening 18. A mirror finished surface 22A of the mirror 22 is directed toward the vehicle rear side. The mirror 22 thus enables an occupant of the vehicle (in particular, the driver) to see an area to the rear side of the vehicle, and helps the occupant to see.

The vehicle lamp device 10 (foot lamp device) is installed on the upper side of the irradiating aperture 20 inside the visor 16.

Figure 2:
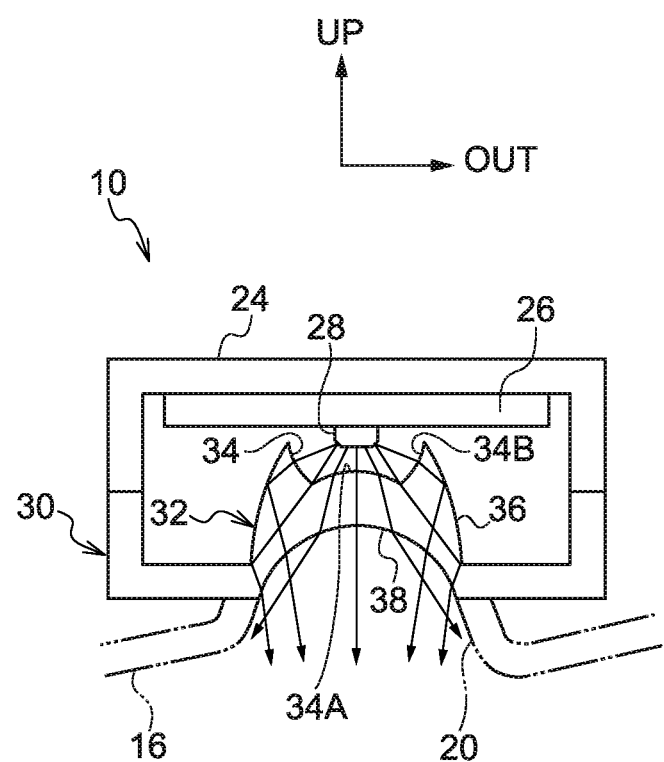
FIG. 2 is a cross-section of a vehicle lamp device according to an exemplary embodiment, as viewed from the vehicle rear.

As illustrated in FIG. 2, a substantially rectangular parallelopiped box shaped housing 24, this being a support body, is provided at the vehicle lamp device 10. The housing 24 is fixed inside the visor 16, and an inner portion of the housing 24 is open toward the lower side.

A flat plate shaped circuit board 26, this being a control unit, is provided inside the housing 24. The circuit board 26 is fixed to an upper wall of the housing 24. A substantially rectangular parallelopiped LED 28, this being an emitter, is fixed to a lower face of the circuit board 26. The LED 28 is disposed coaxially with the irradiating aperture 20 in the visor 16 and is electrically connected to the circuit board 26. On designated occasions, the LED 28 emits light under the control of the circuit board 26, thereby enabling light of cone shape to be emitted toward downwardly. The light emitted by the LED 28 is coaxial with the LED 28 and has a predetermined directional angle (apex angle).

A substantially cuboidal box shaped lens 30, this being an irradiating body, is fixed to the lower side of the housing 24. An inner portion of the lens 30 is open toward the upper side. The lens 30 closes off the inside of the housing 24 from the lower side. The lens 30 is made from a transparent resin (for example, is made from polycarbonate), and the lens 30 is configured so as to be transparent to light (transmit light).

A substantially hemispherical wall shaped light concentration (condensing) element 32 is formed to a lower wall (bottom wall) of the lens 30. The concentration element 32 projects out toward the upper side (inside the lens 30) and is disposed coaxial with the LED 28.

A substantially inverted truncated cone shaped incident recess 34 is formed in an upper portion of the concentration element 32 so as to be coaxial with the concentration element 32. The incident recess 34 is open toward the upper side. A lower face (apex face) of the incident recess 34 configures a spherical incident face 34A. The incident face 34A is curved so as to be convex toward the upper side, and the incident face 34A is disposed so as to be coaxial with the concentration element 32. A peripheral face (side face) of the incident recess 34 configures a substantially inverted truncated cone (cone face) shaped transmitting face 34B. A lower end of the transmitting face 34B is formed so as to be integrally with (be contiguous with) the outer perimeter of the incident face 34A. The transmitting face 34B is disposed so as to be coaxial with the concentration element 32. The transmitting face 34B has a diameter that increases on progression toward the upper side, and is configured so as to curve concave manner in an axial direction. A lower side portion of the LED 28 is inserted at an inner side of the transmitting face 34B such that all of the light emitted by the LED 28 enters the concentration element 32 through the incident face 34A and/or the transmitting face 34B.

A peripheral face (side face) of the concentration element 32 configures a substantially truncated cone (cone face) shaped reflecting face 36. The reflecting face 36 is formed such that an upper end of the reflecting face 36 is integrally with (is contiguous with) an upper end of the transmitting face 34B, and such that a lower end of the reflecting face 36 is integrally with (is contiguous with) an upper face of the lower wall of the lens 30. The reflecting face 36 is disposed so as to be coaxial with the concentration element 32. The reflecting face 36 has a diameter that increases on progression toward the lower side, and is configured so as to curve convex manner in the axial direction. The reflecting face 36 extends to the lower side of the transmitting face 34B, and a portion of the light that enters the concentration element 32 through the incident face 34A, and all of the light that enters the concentration element 32 through the transmitting face 34B, is reflected (total-reflected) toward a central axis side of the concentration element 32 by the reflecting face 36 (in the exemplary embodiment, the central axis passes the center of LED 28 and extends from the upper side to the lower side (from the another side to the one side). Namely, in the present exemplary embodiment, the reflecting face 36 is a total reflection face.

The lower face (inner face) of the concentration element 32 configures a spherical irradiating face 38. The irradiating face 38 is curved so as to be concave toward the upper side, and is disposed so as to be coaxial with the concentration element 32. The lower end of the irradiating face 38 is formed so as to be integrally with (be contiguous with) a lower face of the lower wall of the lens 30. The inside of the irradiating face 38 is open toward the lower side of the lens 30. The curvature of the irradiating face 38 is smaller than the curvature of the incident face 34A. The irradiating face 38 is disposed at the lower side with respect to the incident face 34A, the transmitting face 34B, and the reflecting face 36. The lower end of the irradiating face 38 is disposed in a radial direction inside and in the vicinity of the lower end of the reflecting face 36 such that substantially all of the light that enters the concentration element 32 through the incident face 34A, and all of the light reflected by the reflecting face 36, is irradiated (output) toward the lower side from (through) the irradiating face 38.

The interior (area of the inside) of the irradiating face 38 is in communication with the irradiating aperture 20 in the visor 16, and a lower end portion of the irradiating face 38 is coplanar (flush) with a peripheral face of the irradiating aperture 20. All of the light irradiated toward the lower side from the irradiating face 38 thus passes through the irradiating aperture 20 and is irradiated onto the ground at the lower side of the visor 16, so illuminating the ground. Further, light that is reflected by the reflecting face 36 and then irradiated toward the lower side from the irradiating face 38 is focused (converged) into an inverted cone in the vicinity of the visor 16, and then this light is conically dispersed (diffused) so as to be irradiated onto the ground. Light that enters the concentration element 32 through the incident face 34A and is directly (without being reflected by the reflecting face 36) irradiated toward the lower side from the irradiating face 38 is conically dispersed (diffused) so as to be irradiated onto the ground.

Explanation follows regarding the operation of the present exemplary embodiment.

In the vehicle lamp device 10 of the vehicle door mirror device 12 configured as described above, the concentration element 32 of the lens 30 is disposed on the lower side (one side) with respect to the LED 28. When the LED 28 emits a light which is cone shaped toward the lower side (one side), the light enters into the lens 30 through the incident face 34A and the transmitting face 34B of the concentration element 32 and is irradiated to the lower side (one side) through the irradiating face 38 of the concentration element 32. Light irradiated to the lower side from the irradiating face 38 thus passes through the irradiating aperture 20 in the visor 16 and is irradiated onto the ground at the lower side of the visor 16, thereby illuminating the ground.

The reflecting face 36 of the concentration element 32 completely surrounds the central axis of the concentration element 32 (the central axis of the LED 28). Thus, light that is emitted by the LED 28 and enters the lens 30 through the incident face 34A and the transmitting face 34B is reflected toward the central axis side of the concentration element 32 by the reflecting face 36, and light reflected by the reflecting face 36 is irradiated toward the lower side from the irradiating face 38. The concentration element 32 is thus able to, by using the reflecting face 36, efficiently concentrate (condense) light emitted by the LED 28 onto the irradiating face 38, so the amount of light emitted by the LED 28 but not irradiated toward the lower side from the irradiating face 38 is able to be reduced. The amount of light from the vehicle lamp device 10 illuminating the ground can thereby be increased, and since the amount of light emitted by the LED 28 is able to be reduced, the LED 28 can be made smaller, enabling costs to be reduced.

Further, the irradiating face 38 is curved so as to be concave toward the upper side (another side). Accordingly, the position from which the irradiating face 38 irradiates light is thus able to be disposed at the upper side, enabling the focal point (convergence point) of light, which is reflected by the reflecting face 36 and irradiated toward the lower side from the irradiating face 38, to be closer to the lens 30. This enables effective dispersion of the light after being focused (converged), enabling the region illuminated by the vehicle lamp device 10 on the ground to be enlarged. This also enables an area required for light passing through at the irradiating aperture 20 in the visor 16 to be decreased, enabling the irradiating aperture 20 to be made smaller and enabling the visual appearance of the visor 16 to be improved. Moreover, since the irradiating face 38 is concave, contact between the irradiating face 38 and foreign objects can be suppressed, enabling damage to the irradiating face 38 to be suppressed. Further, since the irradiating face 38 is curved in concave manner, changes in thickness between the incident face 34A and the irradiating face 38 of the concentration element 32 can be suppressed, enabling the occurrence of sink marks and the like in the incident face 34A and the irradiating face 38 to be suppressed when molding (forming) the concentration element 32.

Further, the incident face 34A is curved so as to be convex toward the upper side (another side). Light that enters the incident face 34A can thus be effectively refracted toward the central axis side of the concentration element 32, enabling light to be efficiently concentrated to the irradiating face 38, enabling the amount of light not irradiated toward the lower side from the irradiating face 38 to be reduced, and enabling the amount of light from the vehicle lamp device 10 illuminating the ground to be further increased.

Further, the lower side (one side) portion of the LED 28 is disposed to the inside of the transmitting face 34B (to the inside of the reflecting face 36). This enables the light emitted by the LED 28 to be suppressed from passing over the upper side of the transmitting face 34B and the reflecting face 36, enabling the reflecting face 36 to efficiently reflect the light and enabling light to be even more efficiently concentrated on the irradiating face 38 by the concentration element 32.

Further, the concentration element 32 of the lens 30 is formed only with the incident face 34A, the transmitting face 34B, the reflecting face 36, and the irradiating face 38, thus simplifying the shape of the concentration element 32. Accordingly, the mold for molding the lens 30 can be manufactured easily, enabling costs to be reduced.

Note that in the present exemplary embodiment, the reflecting face 36 is provided around the entire perimeter of the concentration element 32. However, so long as the reflecting face 36 surrounds the central axis of the concentration element 32 (the central axis of the LED 28), the reflecting face 36 may be omitted at a portion or some portions in the circumference direction of the concentration element 32.

Further, in the present exemplary embodiment, the irradiating aperture 20 in the visor 16 is disposed on the upper side with respect to the focal point of light which is reflected by the reflecting face 36 and irradiated toward the lower side from the irradiating face 38. However, the irradiating aperture 20 in the visor 16 may be disposed at the focal point of the light, thereby enabling the irradiating aperture 20 to be further decreased in size.

Further, in the present exemplary embodiment, the lower side portion of the LED 28 is disposed to the inside of the transmitting face 34B (to the inside of the reflecting face 36). However, configuration may be such that the entire LED 28 is disposed to the inside of the transmitting face 34B, or such that the entire LED 28 may be disposed outside (at the upper side) of the transmitting face 34B.

Further, in the present exemplary embodiment, all of the light emitted by the LED 28 enters the incident face 34A or the transmitting face 34B. However, configuration may be such that a portion of the light emitted by the LED 28 passes over the upper side of the transmitting face 34B.

Further, in the present exemplary embodiment, the curvature of the irradiating face 38 is smaller than the curvature of the incident face 34A. However, the curvature of the irradiating face 38 may be the same as, or may be greater than, the curvature of the incident face 34A. Moreover, the irradiating face 38 may be configured with a flat plate shape and made coplanar (flush) with the lower face of the lower wall of the lens 30.

Further, in the present exemplary embodiment, the vehicle lamp device 10 is installed in a vehicle door mirror device 12. However, the vehicle lamp device 10 may be installed at any location on the inside or the outside of a vehicle.

What is claimed is:

1. An irradiating device comprising:
   an emitter that is provided at a vehicle and that emits light; and
   an irradiating body that is disposed at one side of the emitter, and at which a reflecting face is provided so as to surround the emitter, the reflecting face reflecting light emitted by the emitter toward a side of a central axis of the irradiating body, and the irradiating body irradiating light reflected by the reflecting face toward the one side.

2. The irradiating device of claim 1, further comprising an irradiating face that is provided at the irradiating body, wherein: the irradiating face is concave toward another side, and the irradiating face irradiates light reflected by the reflecting face toward the one side of the irradiating body.

3. The irradiating device of claim 1, further comprising an incident face that is provided at the irradiating body at a center side of the reflecting face, wherein: the incident face is convex toward another side, and light emitted by the emitter is incident at the incident face.

4. The irradiating device of claim 2, further comprising an incident face that is provided at the irradiating body at a center side of the reflecting face, wherein: the incident face is convex toward the another side, and light emitted by the emitter is incident at the incident face.

5. The irradiating device of claim 1, wherein the emitter is disposed at an inner side of the reflecting face.

6. The irradiating device of claim 2, wherein the emitter is disposed at an inner side of the reflecting face.

7. The irradiating device of claim 4, wherein the emitter is disposed at an inner side of the reflecting face.

8. The irradiating device of claim 1, wherein the irradiating device is installed at a door mirror device.

9. The irradiating device of claim 1, wherein the reflecting face, structuring a side peripheral face of the irradiating body, is a total reflection face at which light is totally-reflected.

10. The irradiating device of claim 8, wherein the reflecting face, structuring a side peripheral face of the irradiating body, is a total reflection face at which light is totally-reflected.

11. An irradiating device, installed at a door mirror device, the irradiating device comprising:
an emitter that emits light; and
an irradiating body that is disposed at one side of the emitter, and at which a reflecting face is provided so as to surround the emitter, the reflecting face reflecting light emitted by the emitter toward a side of a central axis of the irradiating body, and the irradiating body irradiating light reflected by the reflecting face toward the one side.

* * * * *